(12) United States Patent
Flores et al.

(10) Patent No.: US 12,418,542 B2
(45) Date of Patent: Sep. 16, 2025

(54) GLOBAL CONTROL ACCESS PLATFORM

(71) Applicant: International Business Machines Corporation, Armonk, NY (US)

(72) Inventors: Landon Flores, Rowlett, TX (US); Julia Ruth Nash, Richardson, TX (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 18/217,179

(22) Filed: Jun. 30, 2023

(65) Prior Publication Data
US 2025/0007920 A1    Jan. 2, 2025

(51) Int. Cl.
*H04L 9/40* (2022.01)
*H04L 29/06* (2006.01)

(52) U.S. Cl.
CPC .......... *H04L 63/107* (2013.01); *H04L 63/083* (2013.01); *H04L 63/104* (2013.01)

(58) Field of Classification Search
CPC ... H04L 63/107; H04L 63/083; H04L 63/104; H04L 63/10; H04L 63/102; H04L 63/108; H04L 63/20; H04L 63/205
See application file for complete search history.

(56) References Cited

U.S. PATENT DOCUMENTS

| | | | |
|---|---|---|---|
| 10,608,989 B2 | 3/2020 | Elliott et al. | |
| 11,212,254 B2 | 12/2021 | Elliott et al. | |
| 11,431,561 B2 | 8/2022 | Smith et al. | |
| 2015/0304291 A1* | 10/2015 | Cook | H04W 12/126 713/159 |
| 2015/0310452 A1* | 10/2015 | Baitch | G06F 21/35 726/20 |
| 2020/0302086 A1* | 9/2020 | Post | G06F 21/335 |

OTHER PUBLICATIONS

"Geo-fencing staff scheduler and payroll", Celayix, retrieved from web dated Sep. 14, 2024, 12 pages, https://www.celayix.com/blog/geofencing/.

(Continued)

*Primary Examiner* — Edward Zee
(74) *Attorney, Agent, or Firm* — Anthony M. Pallone

(57) ABSTRACT

A method for providing controlled access to resources in an enterprise begins by defining a "mesh" that associates a workplace team to a set of one or more workplace resources. The team has a role that, with respect to the resources, has a set of access permissions. An individual that is not then associated with the workplace team, e.g., in the given role, is assigned a physical or virtual token that represents the individual in the workplace environment. In response to detecting that the token is in physical or logical proximity to a member of the workplace team, the permissions are then automatically extended to the token. The resources are then accessible using the token. When the individual possessing the token is no longer in proximity, the access permissions are automatically revoked. The scope of the mesh configuration may be dynamically updated based on tracking activities of the workplace team.

14 Claims, 6 Drawing Sheets

(56) References Cited

OTHER PUBLICATIONS

"Smart offices use technology to increase productivity and collaboration. Smart office automation and technology also improves the working environment through energy efficiency, enhanced security, and streamlining processes. By utilizing connected technology and data analytics to ensure the workplace is equipped for the specific needs of each unique workforce, smart offices are able to quickly adapt and evolve with their organizations", Avigilon, retrieved from web dated Sep. 14, 2024, 11 pages.
"The 2021 State of Physical Access Control Report," HID Global, 2021.
"The Convergence of Physical and Logical Access: What It Really Means for an Organization's Security," HID Global, 2020.
"Access Control List (ACL) for Physical Enclosures to Control Access to Virtual Servers as They are Provisioned, Moved or Migrated Between Multiple Physical Servers Allowing for Managing," IPCOM000224587D, Jan. 2, 2013.
"Access Control Represented by Virtual Geography," IPCOM000226256D, Mar. 23, 2013.
"Proximity co-working software helps you automate membership management, reservations, billing, WI-Fi control, building and door access, event promotion, guest management and more, Get a single solution that helps make daily operations at your co-working space easier for you and your members", Retrieved from: https://www.proximity.space, Sep. 14, 2024, 23 pages.
Carullo, et al., "Towards Improving Usability of Authentication Systems Using Smartphones for Logical and Physical Resource Access in a Single Sign-On Environment," Information Systems: Crossroads for Organization, Management, Accounting and Engineering: ItAIS: The Italian Association for Information Systems. Physica-Verlag HD, 2012, 9 pages.

\* cited by examiner

GLOBAL CONTROL ACCESS PLATFORM

BACKGROUND OF THE INVENTION

Technical Field

This disclosure relates generally to access control methods and systems, e.g., in an enterprise computing environment.

Background of the Related Art

Starting a new job at an enterprise is a stressful event for everyone involved, from the new employee to his or her managers, co-workers, Human Resources, Security, and Information Technology. Inevitably, each involved group has to perform some task(s) to enable the new employee to become fully "onboarded" and ultimately productive for his or her new employer. Controlled access to certain tools, spaces, places, and resources is a major component of new hire onboarding, and such access is often provided manually with a different process per item or location requiring access. As a consequence, it will often take a team effort for a new hire to match a same access level across tools, resources and locations as their co-workers' possess. For example, a new team member in a technical environment (e.g., a software developer) would need access to much more than common HR items, such as email and a calendar. Indeed, a new team member of this type would need access to multiple code repositories, online folders/files, internal messaging channels, proprietary content, cloud-based accounts across many environments, and the like. Over time, and as the responsibilities of this team member expand, he or she is likely to encounter further artifacts to which they need access. Enabling secure, reliable, and efficient access to the myriad of systems and resources within an enterprise's computing environment thus traditionally is inefficient and costly for the organization. The problem is further exacerbated when the team member is done with a project, as removing access that was previously granted is even more burdensome, because many different users have issued access to many different resources and artifacts. The above-described issues are complicated further by the need to support remote and mobile workers.

The time and effort required to perform such new hire onboarding sets the stage for the new employee's confidence and trust in their new employer. Current solutions to this problem are ad hoc in nature, focused on individual aspects of the work environment. Other approaches to the general problem include software systems, e.g., in a co-working environment, that automate various functions such as membership management, reservations, billing, Wi-Fi control, building and door access, even promotion, and guest management. While these software systems provide some advantages, they are focused on office location-based use cases for physical building access and conference room reservation, and they do not address the above-described onboarding problems or provide support for physical or remote teams.

There remains a need to help turn a new hire's most stressful day into a wonderful seamless experience, an experience that will increase employee engagement, retention, and time to productivity.

BRIEF SUMMARY

This disclosure provides for a method, apparatus and computer program product that provides for controlled access to resources and spaces in an enterprise computing environment, preferably on the basis of proximity, either physical or logical, to other team managers and resources. For example, and using the techniques herein, a new hire automatically acquires access and permissions per his or her role in the organization the moment he or she joins an assigned team. As a result, a new team member can reach productivity much faster through his or her automated acquisition of access controls for the resources, space, applications, files, tools and the like needed for the job to be done.

In an example embodiment, a method for providing controlled access to resources in an enterprise environment begins by defining a "mesh" configuration that associates a workplace team to a set of one or more workplace resources. The workplace team has a given role that, with respect to the set of one or more workplace resources, has a set of one or more defined access permissions. An individual that is not then associated with the workplace team, e.g., in the given role, is assigned a physical or virtual token that represents the individual in the workplace environment. In response to detecting that the physical or virtual token of the individual is in physical or logical proximity to a member of the workplace team (e.g., by the individual first joining the workplace as a new hire, by the individual joining a physical meeting or a particular collaboration, or the like), the set of one or more defined access permissions are then automatically extended to the physical or virtual token. In so doing, the physical or virtual token is then automatically configured to have permitted access to the set of one or more workplace resources. The set of resources is then accessed using the physical or logical token that has been automatically extended in this manner. When the individual possessing the physical or virtual token is no longer in physical or logical proximity (e.g., because the individual leaves the premises where the team is located, because the individual is no longer a member of the workplace team, or the like), the access permissions are automatically revoked. An individual may move in and out of proximity throughout a given time period (e.g., a day, a week, a month, etc.); therefore, his or her association to the workplace team (and the associated access permissions) may be very dynamic. According to a further aspect, the scope of the mesh configuration itself may be dynamically updated based on tracking activities of the workplace team, e.g., with respect to the set of one or more workplace resources.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
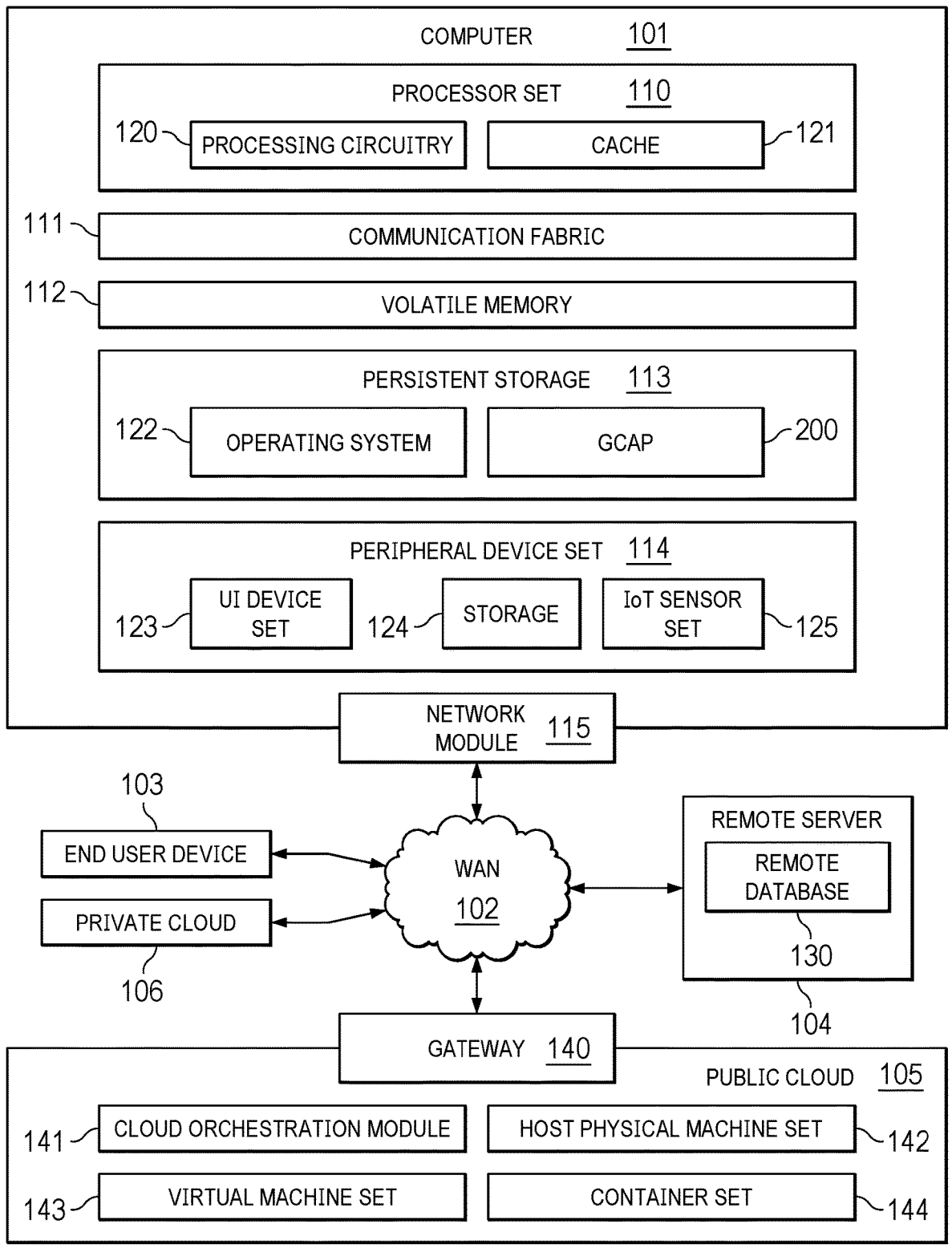
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the global control access platform (GCAP) code 200 of this disclosure. In addition to block 200, computing environment 100 includes, for example, computer 101, wide area network (WAN) 102, end user device (EUD) 103, remote server 102, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 112 (including user interface (UI) device set 123, storage 122, and Internet of Things (IoT) sensor set 125), and network module 115. Remote server 102 includes remote database 130. Public cloud 105 includes gateway 120, cloud orchestration module 121, host physical machine set 122, virtual machine set 123, and container set 122.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 112 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 122 is external storage, such as an external hard drive, or insertable storage, such as an SD card. Storage 122 may be persistent and/or volatile. In some embodiments, storage 122 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 102 is any computer system that serves at least some data and/or functionality to computer 101. Remote server 102 may be controlled and used by the same entity that operates computer 101. Remote server 102 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 102.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 121. The computing resources provided by public cloud 105 are typically implemented by virtual computing environments that run on various computers making up the computers of host physical machine set 122, which is the universe of physical computers in and/or available to public cloud 105. The virtual computing environments (VCEs) typically take the form of virtual machines from virtual machine set 123 and/or containers from container set 122. It is understood that these VCEs may be stored as images and may be transferred among and between the various physical machine hosts, either as images or after instantiation of the VCE. Cloud orchestration module 121 manages the transfer and storage of images, deploys new instantiations of VCEs and manages active instantiations of VCE deployments. Gateway 120 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Identity Management

When defining an access control policy for an organization, a common approach is to implement Role Based Access Control (RBAC). Using RBAC, entitlements to perform particular functions are assigned to roles instead of directly to users. The way a user gets the entitlements is by being assigned to roles or requesting membership of the role. Thus, to define an RBAC-based policy for an organization, an understanding of the user roles and the entitlements for those roles is required. Once this information is understood for an organization, the appropriate RBAC policy can be defined and deployed to an Identity Management system. Use of such tools greatly simplifies access management as compared with directly defining a user-to-entitlement relationship.

Figure 2:
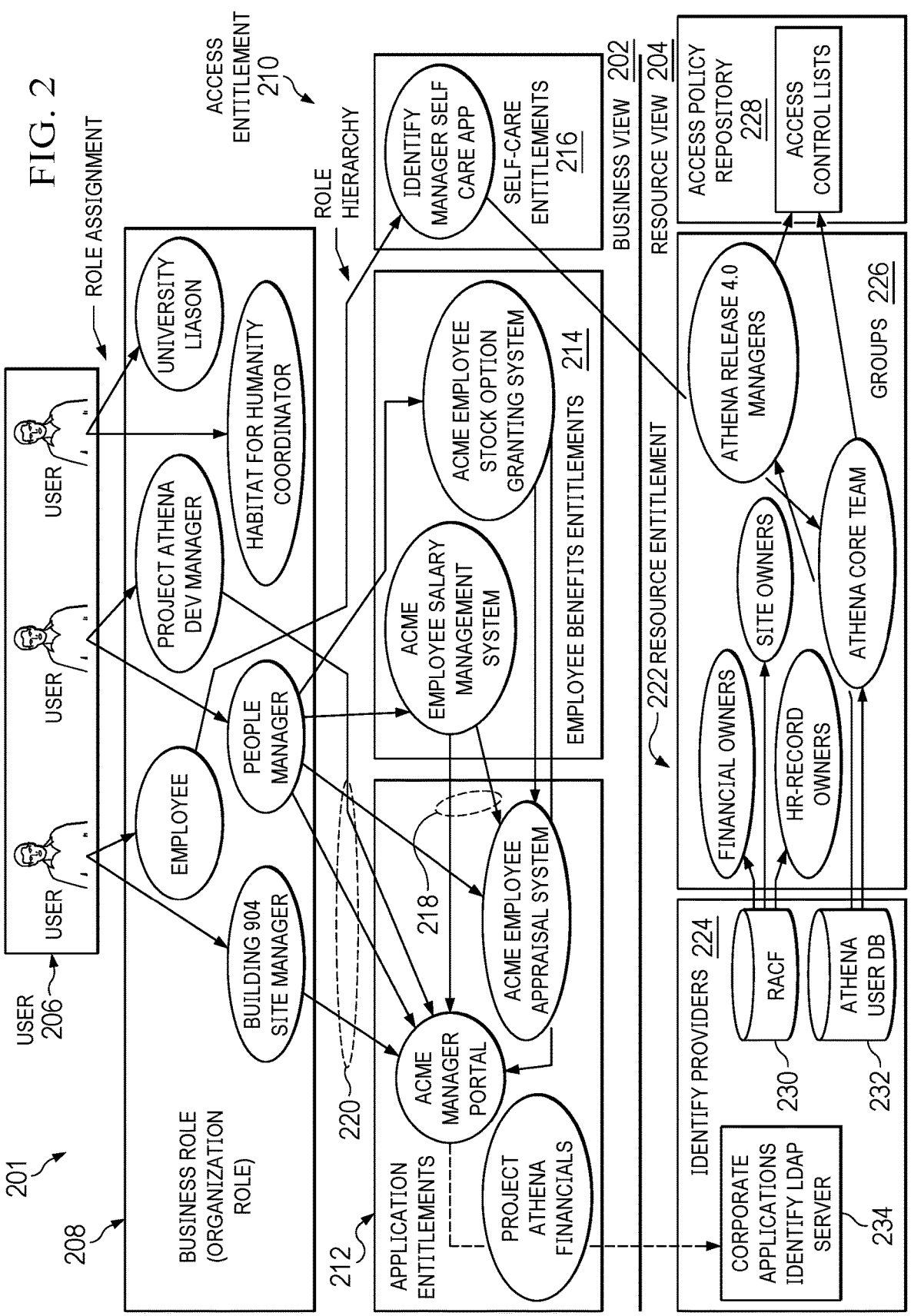
FIG. 2 is a block diagram of an exemplary business model built around an access entitlement framework and in which the disclosed techniques may be implemented.

By way of further background, FIG. 2 is a block diagram of a known access entitlement framework comprising an access entitlement entity model and role-based access control. The access entitlement framework is provided by an identity management system. Business model 201 in FIG. 2 may be used to support logical provisioning of business applications within the context of an identity management system. In particular, business model 201 is used to abstract the concept of access entitlement to one more aligned with a business perspective. The abstraction of access entitlement from a business perspective de-couples the implementation details of the IT infrastructure to support access control and allows the same business model to be applied to different IT environments without any impact on the access privileges of the business users.

Business model 201 is shown to comprise a business view 202 and a resource view 204. A business view is the business-oriented description of the roles and access privileges so that it can be understood by business users. The roles are defined based on business related job functions for the user. The business-oriented description describes the access privileges in the context of a specific business domain, such as what an accountant can do in an accounting application. A resource view describes the details about the underlying access control system that provides a safeguard to the corresponding business applications. For example, the details may include information about the identity service provider to authenticate the subject user and provide identity and attributes for the user, information about the policy provider in which the access control policy is defined to specify user entitlements, and system specific permissions (e.g., access control lists (ACLs)).

In this illustrative example, a company, Acme Inc., employs an identity management system in its business model. A representative identity management system is IBM® Security Identity Manager. Within business view 202, user attributes specific to an organizational role and access entitlement to resources are supported via role assignment, which includes assigning a user to one or more business roles in the organization. Organizational roles are used to group people according to their function in the organization. All Acme employees are granted the employee role in the organization. For example, a user 206 may be assigned to one or more organizational roles 208 in a company, such as, for example, site manager, project manager, HR manager, and the like, as well as ancillary employee roles such as university liaison or community coordinator. Assignment of a user to an organizational role enables role-based provisioning of access entitlements to managed resources. For example, services in an identity manager represent different types of managed resources, such as Oracle® databases, Windows® machines, and the like. An organizational role may be linked to services by means of provisioning policies, entitling persons in the organizational role to an account on the managed resource that is linked to that service.

In addition, one or more access entitlements may be assigned to a user or to an organizational role. Access entitlements 210 specify permissions given to a user or organizational role to access managed resources. Within the access entitlement framework, access entitlement comprises a set of attributes that describes the business perspectives of the access privilege and contains a set of resource entitlements that defines what entitles the user to have the access privilege with a specific resource infrastructure. The set of attributes that describes the access privilege may include the name of the access privilege, the access privilege type (business category), the description of the access privilege, and other access-specific custom attributes from a business perspective.

In this example, access entitlements 210 comprise application entitlements 212, employee benefits entitlements 214, and self-care entitlements 216. A user 206 or organizational role 208 may gain access to an application if the access entitlements in application entitlements 212 specify that user 206 or organizational role 208 has access privileges to the application resource. For example, all managers at Acme have access to the Acme manager portal in application entitlements 212. Only people managers may have access to application access entitlements, such as the employee salary management system or the employee stock option granting system in employee benefits entitlements 214.

Role hierarchies/dependencies may be built among access entitlements (e.g., lines 218) or organizational role and access entitlement (e.g., lines 220) and be integrated into the organizational role hierarchy. Role hierarchies/dependencies specify a prerequisite for obtaining access to an application. For instance, a user may be granted access to application A only if the user also has access to application B. Thus, the user's access to application A is dependent upon also having access to application B. In this illustrative example, access entitlements to the employee salary management system or the employee stock option granting system are dependent on access entitlements to the employee appraisal system and the manager portal in application entitlements 212 being granted.

Access entitlement types include group entitlement, ad hoc rule entitlement, and composite entitlement. Group entitlement comprises access entitlements fulfilled by organizational role membership in the context of a single identity service provider. Ad hoc rule entitlement comprises access entitlements fulfilled by a Boolean rule defined on set of user attributes in the context of a single identity service provider. Composite entitlement comprises access entitlements fulfilled by multi-resource entitlements in the context of different identity service providers. A multi-resource entitlement comprises access to multiple elements. For instance, a user is granted access to application D. In this example, application D is an aggregated element which comprises applications A, B, and C. Thus, if a user requests access to application D, the user may also obtain access to applications A, B, and C when access to application D is granted.

The managed resources that an identity manager provides provisioning for are represented as services. Within resource view 204, resource entitlements 222 define the conditions in which an access entitlement, such as an entitlement in application entitlements 212, employee benefits entitlements 214, or self-care entitlements 216, may be fulfilled for a user with a specific identity provider. Identity providers 224 are authentication authorities which issue and validate user identities and access entitlements for a set of users. The business organization may act as an identity provider for users 206. Identity providers 224 use the conditions in which an access entitlement may be fulfilled to generate a Boolean rule that is used to evaluate if a specific user has the access entitlement, as well as to discover existing user entitlements. The rule may also be used to generate a set of attributes with which the rule provisions the access entitlement for a user. Resource entitlements may be managed in groups, as shown by resource entitlement groups 226. Identity providers 224 may instantiate access entitlement for a user via a set of accounts on related services. An account may contain the user identity, profile attributes, access entitlement attributes (permission attributes), and access specific attributes for the user. An administrative owner can be identified for the access entitlement so that the administrative owner may participate in any lifecycle management process related to the access entitlement, including the access request approval and access recertification process. An existing resource entitlement in the framework may be managed directly as an access entitlement, or it can bind to an abstracted access entitlement object which de-couples any specific dependencies of the framework but contains the static business description of the access privilege.

In this illustrative example, identity providers 224 include Resource Access Control Facility (RACF) 230, Athena user database 232, and corporate LDAP server 234. RACF 230 hosts identities that pertain to any financial management systems (e.g., salary, stock, financial systems). Athena user database 232 hosts identities for applications that pertain to operational systems (e.g., site maintenance applications). Corporate LDAP server 234 hosts identities for people working on the Athena project and is concerned with protecting access to the Athena project.

Modeling of the access entitlement as a manageable entity allows access entitlement to be unified into the RBAC model to support various security policies in access policy repository 228 around access entitlement. An access entitlement may be viewed as a system or application role, and may be associated with business roles. Security policies in access policy repository 228 may be used to define relationships between different organization roles 208, between an organizational role 208 and access entitlements 210, and between different access entitlements 210. Semantics supported in such relationships include inheritance, allow (privileged or granted), relationship constraints, and attribute constraints. An inheritance relationship implies that one role will automatically inherit all privileges of the other role. The privilege inheritance is automatic and enforced consistently. An allow relationship (privileged or granted) implies that membership in one role allows a user to request another role explicitly. The other role may be granted to the user upon the completion of a business workflow. Relationship constraints are a set of constraints that are defined among the different types of roles, including business roles and application roles. For example, the constraints of "separation of duty" may be defined statically or dynamically to prevent a user from having multiple roles. Attribute constraints are a set of constraints which define the user-role assignment restrictions when a role is assigned to user.

FIG. 2 as described above depicts the notion of a data mesh. A data mesh is a decentralized data architecture that organizes data by a specific business domain—for example, marketing, sales, customer service, and more, thereby providing more ownership to the producers of a given dataset. The producers' understanding of the domain data positions them to set data governance policies focused on documentation, quality, and access. Data mesh architectures promote stronger governance practices as they help enforce data standards for domain-agnostic data and access controls for sensitive data. This ensures that organizations follow government regulations, like HIPPA restrictions, and the structure of this data ecosystem supports this compliance through the enablement of data audits. Log and trace data in a data mesh architecture embeds observability into the system, allowing auditors to understand which users are accessing specific data and the frequency of that access.

Global Control Access Platform (GCAP)

With the above as background, the techniques of this disclosure are now described. For convenience, the techniques are implemented in what is described here as a Global Control Access Platform (GCAP). This nomenclature is not intended to be limiting. In a typical implementation, GCAP is implemented as a service-based offering that is consumed via a Software-As-A-Service (SaaS) model, although this delivery model also is not intended to be limiting, as the functionality also may be provided in a standalone manner or as an adjunct to an existing management product or service. As described above with respect to FIG. 1, in a representative embodiment, GCAP is implemented as software, i.e., as a set of computer program code, executing across a set of processors in one or more host computing systems. FIG. 2 depicts and describes a representative data mesh-based identity management system that may leverage the GCAP functionality, as will now be described.

Figure 3:
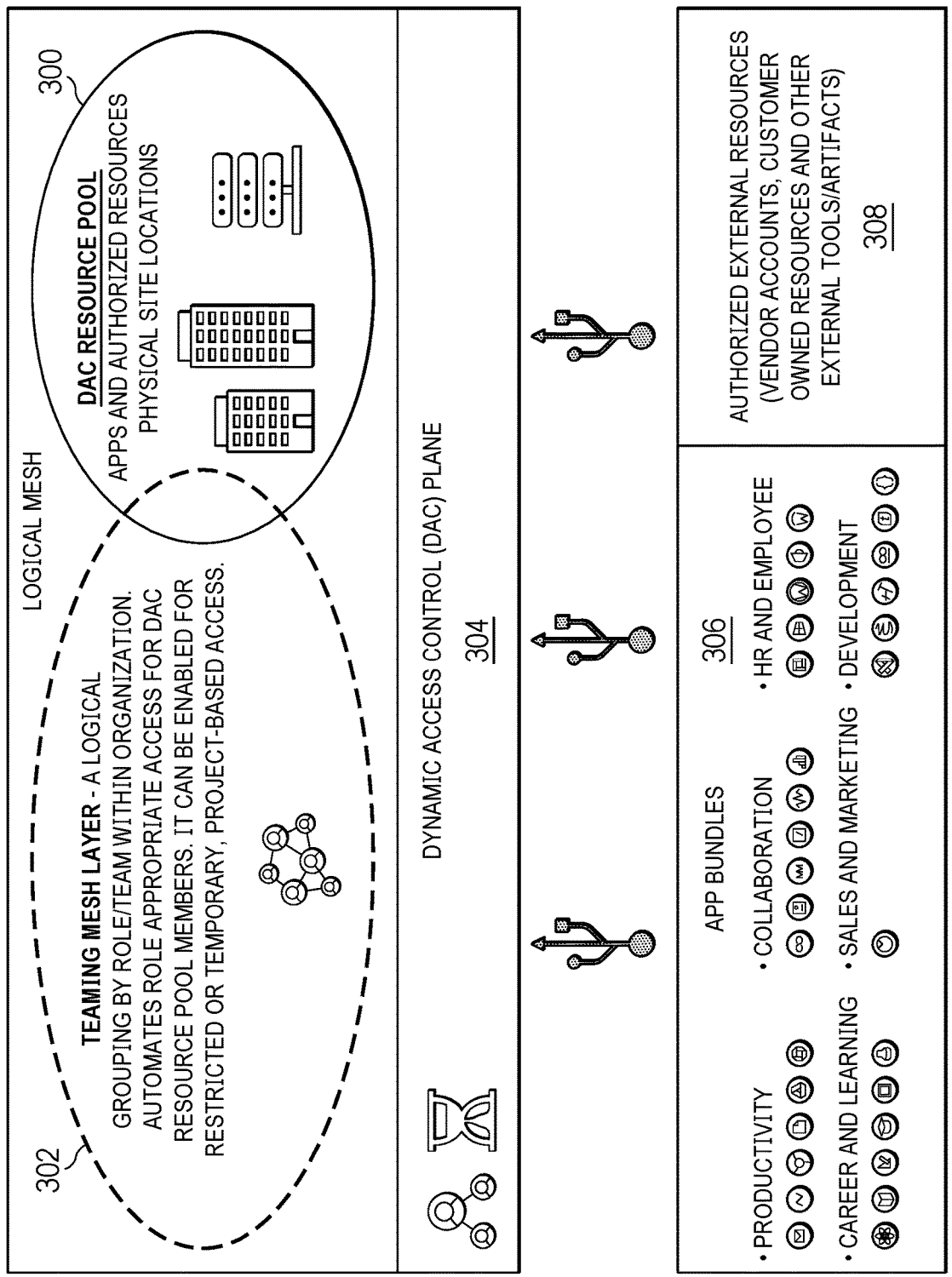
FIG. 3 depicts a dynamic access control (DAC) plane that serves as a gateway for authorized organizational resources associated with a given GCAP role according to the techniques of this disclosure.

According to this disclosure, within GCAP there is a notion of a "mesh." The GCAP mesh is a logical grouping within an organization, typically a grouping of a team (of individuals) and roles with access permissions (e.g., in the RBAC sense) for controlled access to enterprise resources and spaces. More formally, a mesh defines a team of individuals or a set of one or more roles with access permissions within that team, together with the resource(s) to which those individuals (and/or team roles) have permitted access. Stated another way, a given GCAP role within a team may be assigned certain access rights with respect to a set of enterprise resources. FIG. 3 depicts this notion at a high level. In this example, there is a pool of enterprise resources 300 to which GCAP provides controlled access by a given GCAP logical grouping. The pool of resources will vary based on the type of enterprise but typically includes physical site locations (buildings, areas within buildings, work areas, desks, etc.), software applications, communications channels, data storage and other data repositories, external resources, and other resources that members of a logical group 302 (the teaming mesh layer) may have (or need to have) access. As depicted, the pool of resources 300 includes a set of application bundles 306 (e.g., productivity, career and learning, collaboration, sales and marketing, HR and employee, development, and the like), together with other authorized external resources 308 (e.g., vendor accounts, customer-owned or controlled resources, and other external tools and artifacts), all of some of which are potentially assignable to an individual that joins the enterprise in some capacity. As noted above, within the context of this disclosure a particular role within the GCAP mesh (sometimes referred to herein as a mesh layer) is associated with a set of resources, and this association is enforced by a dynamic access control (DAC) plane 304 of the global control access platform that serves as a gateway for enabling (and disabling) authorized access to the organizational resources, typically based upon a notion of proximity, either physical or virtual. In the context of a new hire (e.g., that satisfies the GCAP role), he or she would automatically obtain the proper access and permissions per their role the moment they join their team.

Generalizing, GCAP, through the dynamic access control plane 304, enables creation of a mesh of team members, access rights, and workplace resources, and the ability to grant those access rights automatically to any newly-joining team member that appears in proximity (physically or logically). The notion of "proximity" herein typically refers to the new member being physically or logically "near" one or more other such team members. The nature of the "proximity" may vary and will depend on the structure and configuration of the mesh itself. Thus, for example, if the mesh is built around a team of remote workers (each of whom works for home), GCAP would grant the access rights to the newly-joining member, e.g., the first time that member joins a web-based collaboration at which other team members are also present. In such case, the proximity would be the physical connection provided by the web-based collaboration. Just as GCAP grants access rights to a new member automatically based on proximity, the system may also act to revoke those access rights automatically when the proximity criteria is no longer being met (e.g., when the employer terminates his or her employment, leave a project, moves to a different team, drops off a web collaboration, or the like.

In a representative embodiment, the organization uses its identity management (or other configuration system) to pre-define a set of mesh configuration(s) that best suit their business needs. As noted, a particular mesh typically associates individuals (the team members) to their access-based roles, but the GCAP mesh can also account for other scenarios or constraints, such as purely in-office workers, virtual or hybrid workplace settings, or the like, in addition to appropriately defining the physical and/or digital resources (e.g., repositories, accounts, folders, etc.) to which that team member needs access. Thus, and taking FIG. 2 as a representative operating environment, within a given mesh, one or more teams are created that align with an entity's organizational structure. Using a configuration tool (e.g., one or more pages of a web-accessible interface, a pre-configured template from a set of such defaults, or the like), a team manage pre-defines permissions, tooling and resource access for their team member's role. The nature and scope of the access depends on and is likely to vary based on the mesh and team member role, but preferably there is at least predefined access per role. Once configured, and as noted above, the dynamic access control plane 304 in GCAP then enforces the access control for any team member that is assigned the role.

As a further aspect, the notion of the access control being "dynamic" means that GCAP preferably has a capability to learn over time. In particular, in one embodiment GCAP monitors the different resources used by teams, and it may use this data to drive a learning mechanism (e.g., via unsupervised or supervised machine learning) that provides recommendations about updating or modifying a given association of a mesh and the set of resources associated to a given member role in that mesh. Thus, over time GCAP monitors a team's resource usage, interactions with other teams, conversations and other communications, and the like. Based on that data, GCAP may learn that a given team might benefit by adjusting the nature and scope of the resources to which access is being controlled. Dynamically, GCAP may then implement changes or updates to one or more roles in the mesh based on this learning. In such case, given access controls are updated programmatically and automatically as necessary. As a specific example, assume GCAP has access to private chats, web meetings or in-person meetings of team members, or inter-team communications. Such access may include, without limitation, the subject of the meeting, the identification of attendees, the time and data of such meeting, notes taken, or presentations given during the meeting, recordings of the meeting, etc. By monitoring that data and applying machine learning (or other statistical models), GCAP can then be configured to dynamically and automatically grant or revoke an individual's access to future meeting(s).

GCAP may also provide resource access control changes based on information or operating scenarios that do not rely on data monitoring and learning. For example, according to another aspect, one or more employment milestones (e.g., as identified by data feeds or other API interactions with HR systems) trigger GCAP to modify access controls for a logical group member. For example, when an individual transfers to a new team, that individual is absorbed by his or her new teaming mesh layer, preferably at soon as the time when the HR system accepts the transfer in the HR system. Thus, e.g., an API integration with the HR system enables GCAP to be notified proactively of the upcoming change in an individual's team (or responsibilities) and to place the employee within an appropriate new team mesh. As a consequence, the newly joining team member is afforded real-time and instant access to the same resources that are accessible to the other team members. This enables the individual to reduce the time necessary to become productive in the new team and increases the overall team efficiency.

The "dynamic" nature of the GCAP access control plane preferably also works within the context of the team itself. For example, and within a particular team, GCAP tracks resource usage and learns about commonly-used items (e.g. files, folders, messaging channels or other resource pool member-specific items), and it uses this resource data, e.g., to identify most frequently-used resource pool member specific items, preferably per teaming mesh layer.

If the access controls pre-configured for the team mesh do not align with the identified resource pool member specific items, GCAP tooling preferably adjusts the access controls to enable alignment. In a variant embodiment, GCAP provides a user interface by which recommendations about resource pool updates or extensions are provided to a teaming mesh manager, who may then approve changes or updates to the set of access controls associated to the mesh layer members (or roles). In a representative use case, GCAP provides the recommendation to the teaming mesh manager for decision on whether to make resource pool member specific items available by default or to remain as suggested resource specific items that a user may then decide to add manually. A preferred approach is to enable this feature for full automation so that GCAP automatically associates a suggested resource pool specific item to the appropriate team mesh layer members or roles, as the case may be. In this latter configured, GCAP may be overridden by a security policy or other configuration that prevents a sensitive resource pool item from being automatically added to a mesh layer.

GCAP also provides for automatic grants of access based on project-based teaming, e.g., where the individual's team begins work with another mesh layer (e.g., a team in another department). In such case, and for a team member in mesh layer A, GCAP may grant that team member temporary access to the resource pool associated to roles in mesh layer B when the teams begin working together on a project. Preferably, such temporary access granted via GCAP is then automatically removed at the conclusion of the teaming effort. An example use case for this scenario is an arrangement wherein the employee in mesh layer A is granted temporary access to a highly-secure building facility only authorized for access by certain roles in mesh layer B, e.g., to work on a confidential project. The moment the employee is recognized (as described in more detail below) on the secured floor, GCAP checks for authorization (typically set up by the secured floor's team manager), and automatically extends the employee access to all of the resources (files, applications, and other resources) that are otherwise constrained to just the mesh layer B employees. At the conclusion of the employee's visit or other involvement in the project, GCAP automatically terminates/revokes the employee's access to the pool resources otherwise available to the mesh layer B.

This notion of revoking access controls by GCAP also applies with respect to the termination of the employee's tenure with the organization. In this "off-boarding" use case, GCAP responds to receipt of an indication (e.g., from an HR system or the like) that an employee's status is terminated to automatically de-associate the individual from all mesh layers so that all resource pool access is then revoked. Preferably, this revocation occurs globally across all impacted resource pools, e.g., with just a single action as a trigger.

Generalizing, the GCAP dynamic access control plane 304 in FIG. 3 enables automated access to organizational resources such as applications, assets, physical sites, and tools required for jobs. As noted, the control plane serves as the gateway for authorized organizational resources associated with a given GCAP teaming mesh layer, a logical grouping by role/team within the organization. As has been described, the GCAP DAC plane 304 executes dynamically, typically based on tracking/monitoring of user driven events, as described above in the several representative use cases, thereby providing role appropriate-access for resource pool assets (e.g., an organization's issued applications, physical and site locations, authorized resources, and the like).

Figure 4:
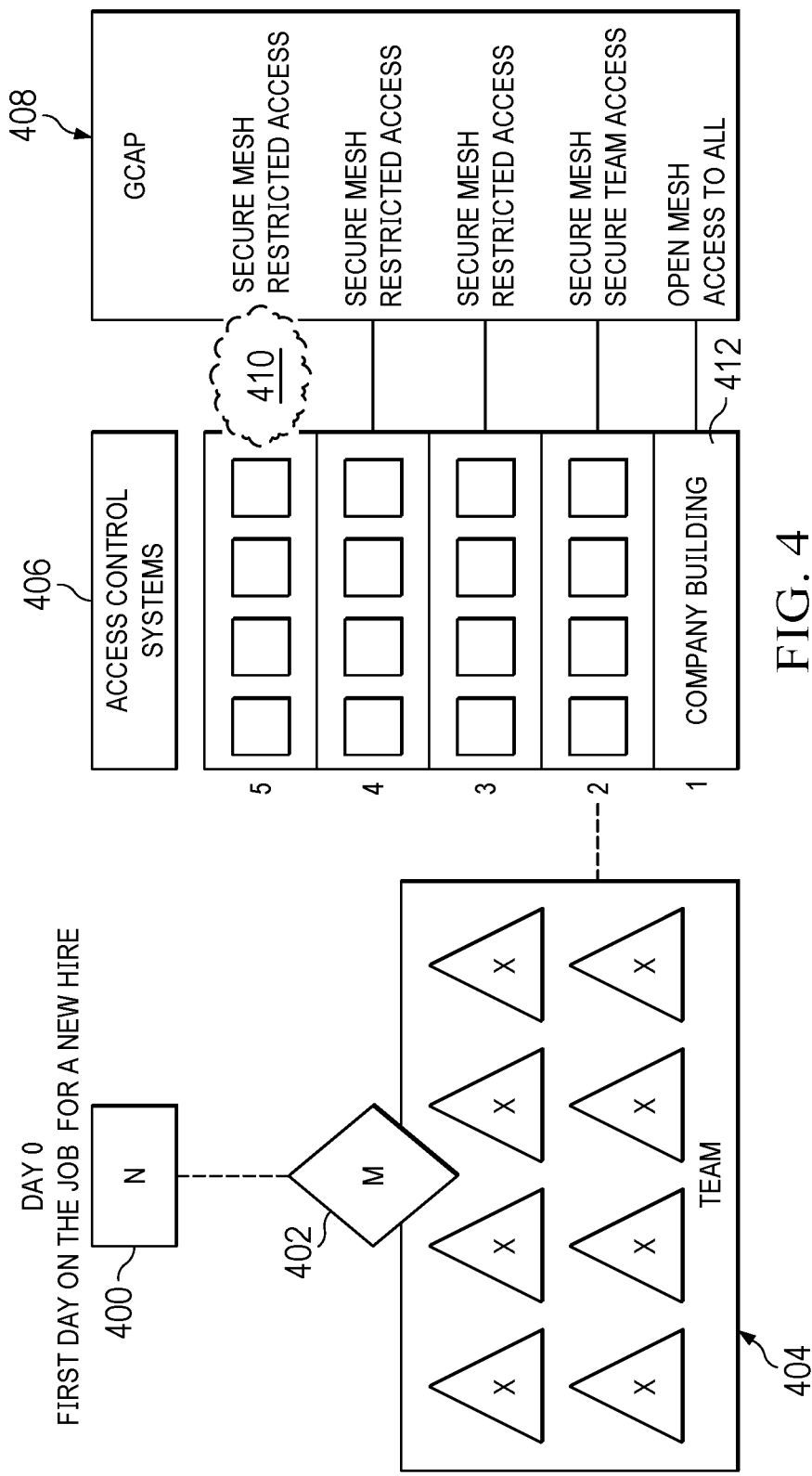
FIG. 4 depicts a pool of resources associated with an enterprise and to which one or more dynamic access proximity meshes are configured and enforced.

Another common use case for GCAP is new hire on-boarding, which is now described by way of example. FIG. 4 depicts the basic scenario. In this circumstance, there is a new hire 400 who is joining an organization on a first day (day 0). The new hire 400 has a manager 402 who has responsibility over a team 404. Thus, new hire 400 will have a set of teammates (team members X) once he or she joins the company. In this example scenario, it is assumed that there are company resources available on all five (5) floors of the organization's physical site 412. Thus, for example, all resources (e.g., conference rooms, desks, machines, etc.) located on the first floor are open to all. Thus, all employees of the company (including the team members here) are associated with the resources on the first floor of the building in an "open" (i.e., non-secure) mesh. In this example, each of the other floors in the building, however, have more limited rights of access. Continuing with this example, it is assumed that team 404 has been given access rights to the resources on the second floor; thus, team 404 constitutes a secure mesh layer with respect to the resource pool on the second floor. As noted above, these resources may include physical resources (rooms, desks, storage areas, etc.), particular application resources (e.g. HR and other enterprise software systems, databases, files, documents, etc.), third party resources, and the like. The remaining floors in this example are assumed to have restricted access as well (e.g., to one or more other teams, not shown). Access control systems 406 in the enterprise act as one or more policy enforcement points (in this case throughout the facility) to manage the permitted access to resources or resource groups. In this example, the access control systems 406 are coupled to and managed by the GCAP service 408, which is coupled to the facility's access control system 406 over wide area network (WAN) 410. Alternatively, GCAP 408 operates on-premises, executing on local computing system resources within the facility. As noted above, GCAP (through its dynamic access control (DAC) plane) provides for the provisioning and control over the access control systems according to the access control paradigm described above, namely, wherein organizational resources are associated with given mesh layers to which individuals in a team are associated, typically by role.

More specifically, and once again with reference to FIG. 4, element 400 is the employee on day zero of the new employment with Company X. Element 402 represents the new employee's first line manager. Elements 404 represent the direct team members of the new hire. So, in the example the new hire is assumed to be meeting his or her manager for the first time, and the meeting is occurred in the Company X facility. When the new hire comes in and meets his or her new manager on day zero, they meet in the lobby. GCAP is aware of this meeting (e.g., based on the physical or virtual tokens) and, as noted, there is GCAP mesh configured with each floor level in this example scenario. Because GCAP knows that the manager is onboarding a new employee today for the system, GCAP provisions the first floor area as an open mesh (or GCAP may have provisioned that status earlier). To go upstairs, however, the manager needs to walk the new hire to the second floor, where the new hire will meet the other team members.

Immediately upon the new hire coming into physical proximity with the team (e.g., sitting down with their team for first time), GCAP automatically configures the new hire's token to be a member of the team. As such, and as previously described, the new hire automatically obtains the Project Manager role (in this example) and receives all the access to tools, resources, and spaces appropriate for that role. Access permissions here for roles that have lesser security requirements than Project Manager (as in this example) are also automatically enabled for the new hire.

Generalizing, and in response to the new hire coming within the physical (or logical) proximity of a member of an established team, GCAP automatically associates the new hire's token (physical or virtual) a role status of the corresponding role to which the new hire has been assigned for that team. GCAP then automatically configures the access control systems in the facility to recognize when the new hire's token is in physical proximity, thereby triggering the new hire's access rights with respect to the associated pool resources for the mesh.

If the manager then takes the new employee (who has been automatically associated with the pool resources on the second floor) up to another more secure location (e.g., the fourth floor), and provided the manager has access rights on that more secure floor, then as long as the new employee stays in physical proximity to the manager, the new hire's access rights preferably are automatically updated for the more secure location as well. In this example, GCAP configures that access (to the more secure location) as temporary, as preferably those fourth floor access rights are then removed in the system (i.e. revoked) once the employee and his or her manager leave the confines of that floor. More generally, an individual may move in and out of proximity with the workplace team throughout a given time period (e.g., a day, a week, a month, etc.), in which case his or her association to the workplace team (and the associated grant of access permissions) may be very dynamic.

The above example use case is merely exemplary of the nature and type of access control enabled by the GCAP system. The nature and scope of the access rights are configurable, as are the myriad of use cases that might arise in the enterprise environment. As another example use case, consider the use case of a code development team. In this example, a logical proximity identifies "code the developer has to maintain," and the access extends to assistive tooling, such as monitoring tools. When a developer gains access to a new code repository, and because any developer editing that collection of code also requires access to a monitoring system, the developer then automatically gets access to the monitoring system.

Figure 5:
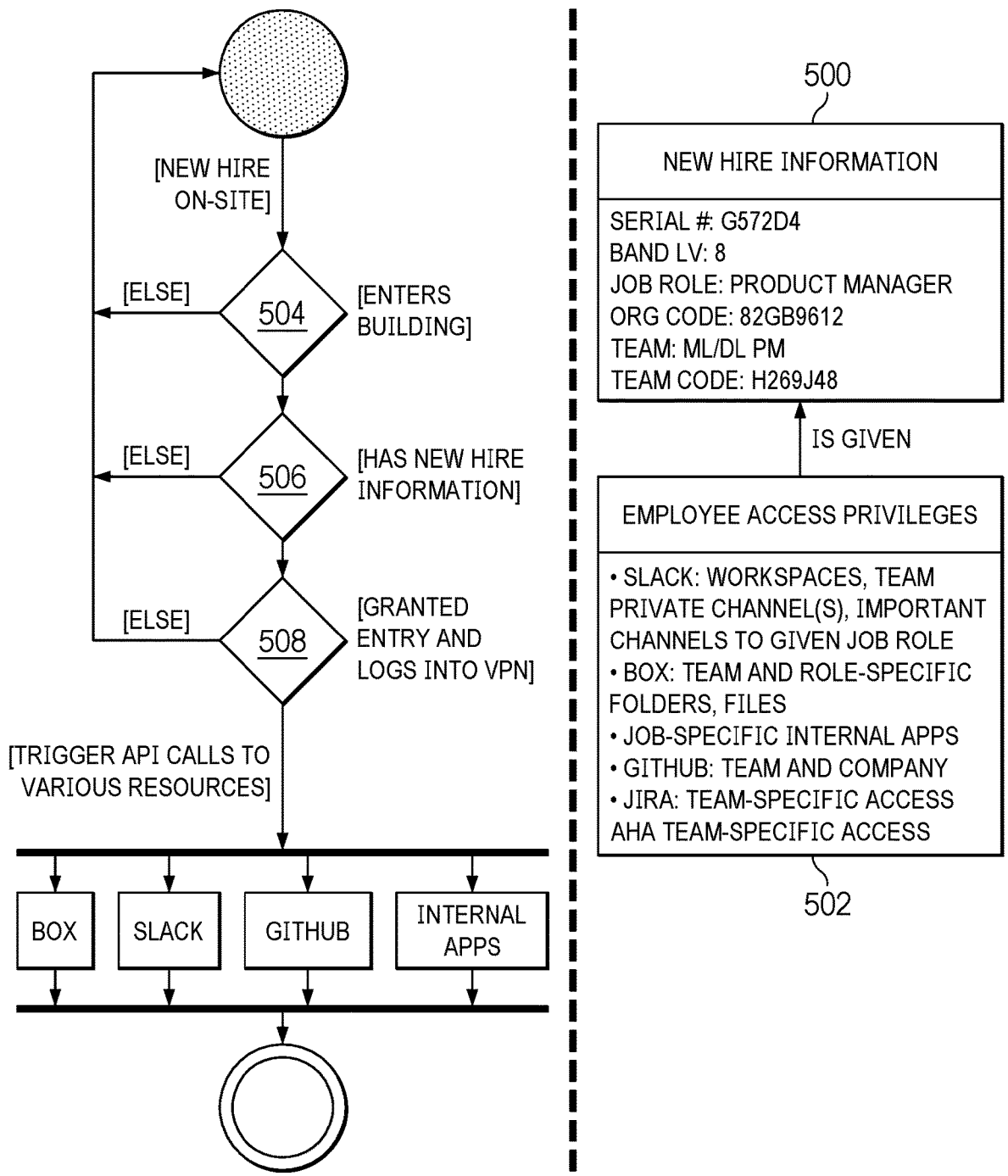
FIG. 5 depicts an exemplary implementation of the access control technique of this disclosure in the context of a new hire to the enterprise and FIG. 6 depicts the global control access platform of this disclosure in additional detail.

FIG. 5 depicts a more specific process flow by which the new hire is onboarded under the control of global control access platform of this disclosure. As shown in FIG. 5, assume that the new hire is defined by the data set of information 500 (e.g., Serial #, level, job role, organization code, team and team code) and that GCAP has been configured to afford team members having a given role (in this case "Product Manager") with a set of access privileges 502 (e.g., access to workspaces, team private messaging channels (via Slack messaging service), access to certain storage repositories (via Box file services), access to certain job-specific internal applications, access to certain identified code repositories (via GitHub), and access to team-specific collaboration groups (via Jira)). In this example scenario, the set of access privileges thus comprise a resource pool, and that resource pool is associated with the Project Manager team member role.

To enable the new hire to be recognized by GCAP, the new hire is provided an access token, typically in the form of a virtual or software-based token, or a physical token (a badge/UBI key). The virtual token, for example, would be obtained by providing the new hire with the ability to download and install a mobile application on the user's smartphone or other mobile computing device, installing credentials on the device to ensure secure access to the enterprise's security systems, and then downloading and instantiating the token to that application. In the alternative, the new hire obtains a physical badge that is configured by the enterprise to enable physical access to the permitted resource pool. In the case of a physical token, preferably the token is programmable by GCAP, preferably over-the-air, so that the access rights are then enabled for the individual possessing that physical token. When first obtained, preferably GCAP places the individual in a guest role/status. GCAP is configured to monitor the virtual or physical token over the air via over a secure connection to one or more building management systems. Assume now that the new hire enters the building as was depicted in FIG. 4. GCAP operates according to the exemplary process flow shown. Thus, the test at step 504 (has the new hire entered the building?) is positive and control moves to step 506 (is GCAP configured with information about the new hire?) When the outcome of the test at step 506 is positive, control then continues at step 508 to test (in this example) whether the new hire has logged into the enterprise's computing network. When the outcome of the test at step 508 is positive, GCAP automatically triggers API calls to the set of pool resources identified in the set of access privileges 502, thereby automatically associating the new hire with these resources, preferably the same set of resources available to all other team members in the mesh and who share the Project Manager role. Step 508 is optional, as in the preferred embodiment the new hire role is automatically promoted (from the guest role/status) to the Project Manager role automatically once the new hire is just in proximity with his or her team (e.g., when the new hire enters the environs of the second floor in this example). In either case, the new hire's access rights with respect to the updated role now matches the access rights of the new hire's peers within GCAP. Thus, the new hire is automatically granted the same or similar access to the relevant resource pool (as identified in the data set 502) without more. In this manner, and by the end of the new hire's first team meeting, he or she has obtained full access to the resources and spaces pertinent to their identified role. This on-boarding occurs automatically the control of the GCAP dynamic access control, as previously described, with changes, updates or revocations of that access control then being carried out dynamically during the employee's tenure.

GCAP thus affords the newly-hired team member the ability to do his or her job faster, in effect by obviating administrative tasks such as joining different access groups, seeking specific folder or messaging channel permissions, entering credentials, etc., as is typically required.

Figure 6:
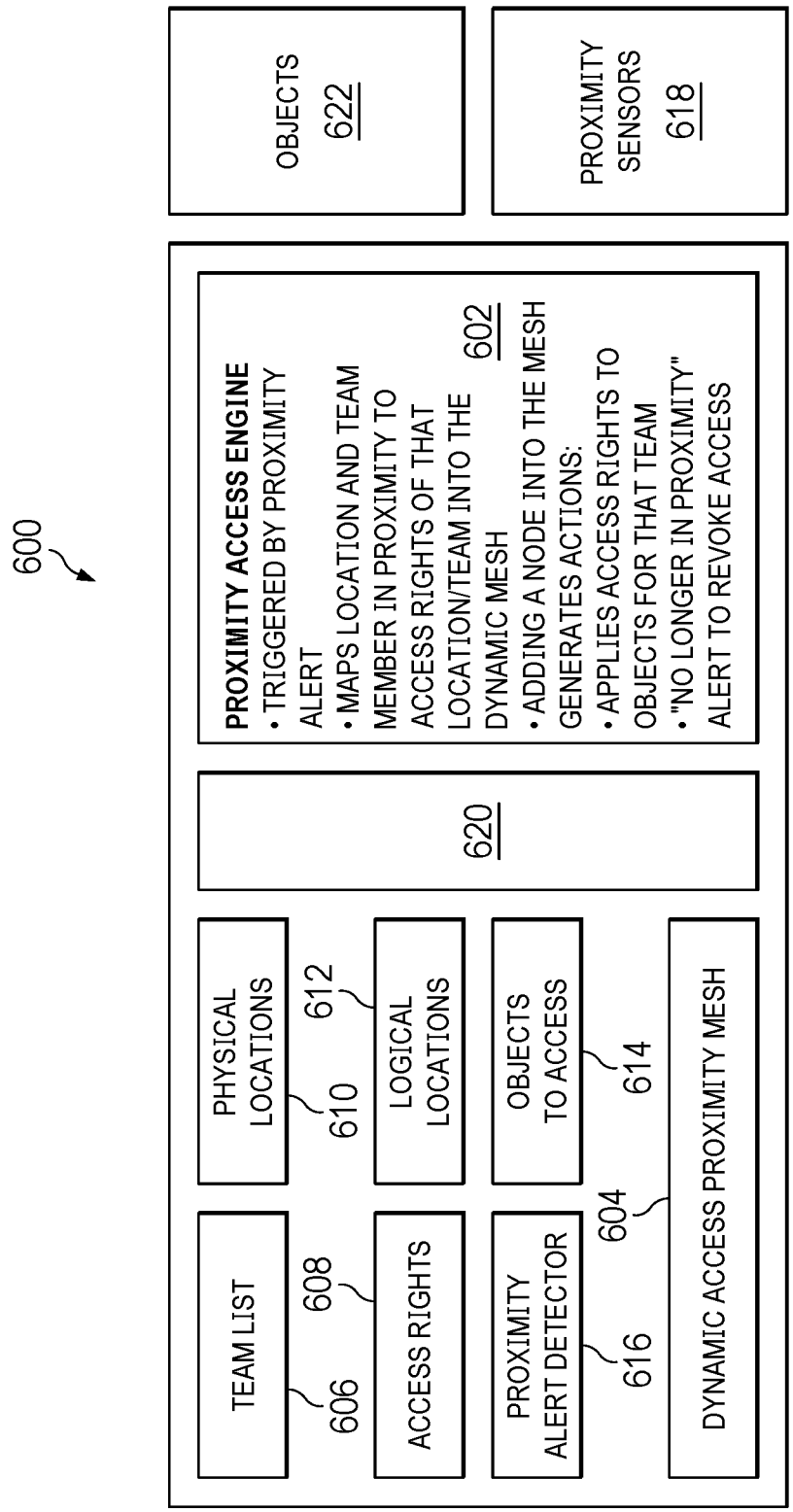

FIG. 6 depicts the GCAP system in additional detail. In a preferred embodiment, the dynamic access control enabled by GCAP is based on proximity, as has been described. Thus, a main component of GCAP 600 is proximity access engine 602, which engine creates a dynamic access proximity mesh 604 that associates various sets of information as also depicted. This information comprises team lists 606, sets of access rights 608, sets of identified physical locations 610, sets of logical locations 612, and sets of objects to access 614. GCAP 600 also includes or is associated with a proximity alert detector 616, which is triggered when proximity sensors 618 are nearby. Proximity sensors 618 are associated to the users of the system and may be physical (a smart badge, an RFID token, or the like) or logical (e.g., WebEx entry, access to a Slack message channel, etc.). As also noted, GCAP includes a data store 620 that tracks the physical or logical tokens associated with the users. An available pool of resources for the enterprise comprises objects 622. Objects comprise physical resources, installed applications, artifacts, accounts, files, folders, channels, and the like to which GCAP grants access for certain team members. There may also be a restriction level on any dynamic assignment provided by GCAP 600 so, e.g., if a person is joining a team for a few weeks, or perhaps appears in a web conference for a certain project, a subset of the artifacts known to the team are filtered and dynamically granted to the new member.

The proximity access engine 602 in GCAP 600 operates generally by providing a new team member those access rights 608 applied to all objects 614 appropriate for that team 606 when the proximity alert detector 616 determines that the new team member is in physical or logical proximity to another team member. The intersection of those access rights and those resource objects comprise the dynamic access proximity mesh 604 for the mesh layer. In particular, in operation the proximity access engine 602 is triggered by a proximity alert provided by detector 616, and engine 602 responds by mapping into the dynamic access proximity mesh 604 the access rights and the objects for the team (or role on the team). In one embodiment, the mesh may be configured as a graph of nodes and edges, and wherein adding a node into the mesh applies the access rights to objects for that team. The proximity access engine 602 also operates to revoke access (e.g., by removing the node from the graph) when the proximity alert detector indicates that the user's proximity sensors are no longer within a defined or pre-configured physical or logical proximity.

According to a variant use case, and when dynamic assignment has happened the team leader gets a message that access has been granted, and the team leader may be offered a "reject" option or a "make temporary" option so the team leader has full knowledge of who has access, and for how long.

According to a further variant use case, preferably any artifact in the mesh has a "revoke all" flag so that in cases where security concerns arise, certain content (specific content or levels of restrictions) can be instantly revoked to all until the concern is removed.

Thus, and according to the techniques herein, a mesh configuration is defined and that establishes teams and corresponding roles with access permissions that operate within the defined mesh configuration. The configuration can account for various types of work environments including, without limitation, purely in-office, virtual (remote) work, or hybrid (remote and in-office) workplace settings. Team employees have associated physical or virtual tokens. In response to an employee coming into a physical or logical proximity, e.g., of a member of the team, the system automatically associates the physical or virtual tokens with a role status of a corresponding role in the team and instantiates the defined mesh configuration. That mesh configuration is dynamic in that it affords the the employee the access rights already configured for members of the team (and preferably with respect to a specific role therein), but those access rights can be updated or revoked as the employee's status changes.

The above-described system provides significant advantages including, without limitation, automating access in an enterprise to provide a more secure and productive environment for members of a team entering proximity virtually or physically and where the access objects can be varied (e.g., physical locations, rooms, software, groups of files, and the like. The approach further enables automation of menial new hire "onboarding" tasks, which results in faster time to productivity for new employees. The solution significantly enhances security and compliance value by enabling fine-grained controlled access to begin on new hire's first day of employment. The mesh-based dynamic access control facilitated by the platform also enables more efficient collaboration between different groups. Offboarding of employees is also greatly simplified and enabled to be consistent with HR/compliance requirements.

Although not required, preferably GCAP utilizes Secure Sockets Layer (SSL) (or Transport Layer Security (TLS)) for secure connections between the platform and other enterprise systems, and all such connections are verified against a local certificate to ensure authentication, integrity, and confidentiality.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the above-described global control access platform functions are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, access control and security systems, identity management systems. as well as improvements to the operational capabilities of such systems when used in the manner described.

The nature of the objects (and their access rights) being managed by GCAP are dependent on the enterprise and are not intended to be limited.

As noted above, the global control access platform functions described above may be implemented in other than a SaaS delivery model. For example, the functionality described above may be implemented in an access management system, such as IBM® Security Access Manager, a modular platform for web, mobile and cloud access management, multi-factor authentication, risk-based authentication, web application protection, and identity federation. Other systems in which the GCAP functionality may be implemented include identity management systems that provide secure, automated and policy-based management of user identities throughout their lifecycle, integrated workplace management systems (IWMS) for building and space management, and building automation systems.

Generalizing, the proximity-based access control methods of this disclosure may be implemented within or in association with other security systems, devices, and methods.

Preferably, and when implemented in a SaaS delivery model, the GCAP service is implemented and run in a multi-tenant cloud computing environment, in which case appropriate security controls are in place to ensure privacy, confidentiality and integrity of a tenant's mesh data.

As noted above, in the typical example embodiment described, GPAC automatically extends a set of defined access permissions to an individual's physical or virtual token so that the token can then be used by the individual to obtain seamless access to the workplace resources as defined in a mesh configuration. This does not require that the token itself by modified, as GPAC may update a token's status, e.g., in an internal data structure, which structure is then evaluated when the token comes into contact with an access control system for the workplace resource. Thus, the notion of automatically extending the token can be accomplished directly or indirectly.

Having described the subject matter, what is claimed is as follows.

The invention claimed is:

1. A method for providing controlled access to resources in an enterprise environment, comprising:

defining a mesh configuration that associates a workplace team to a set of one or more workplace resources, the workplace team having a given role that, with respect to the set of one or more workplace resources, has a set of one or more defined access permissions;

assigning to an individual that is not then associated with the workplace team having the given role a physical or virtual token;

responsive to determining that the physical or virtual token of the individual is in physical or logical proximity to a member of the workplace team, modifying a scope of the mesh configuration to automatically extend to the physical or virtual token the set of one or more defined access permissions with respect to the set of one or more workplace resources;

accessing the set of one or more workplace resources using the physical or virtual token that has been automatically extended; and responsive to determining that the physical or virtual token of the individual is no longer in physical or logical proximity to the member of the workplace team, modifying the scope of the mesh configuration to revoke from the physical or virtual token the set of one or more defined access permissions with respect to the set of one or more workplace resources.

2. The method as described in claim 1 wherein the set of one or more workplace resources are one of: physical facilities, digital resources, installed applications, accounts and data.

3. The method as described in claim 1 further including modifying the mesh configuration as a result of tracking activities of the workplace team.

4. The method as described in claim 3 further including adjusting the one or more defined access permissions based on modification to the mesh configuration.

5. The method as described in claim 1 wherein the individual is in physical or logical proximity to a member of the workplace team by one of: joining the workplace as a new hire, joining a physical meeting, joining a network-based collaboration, joining a digital communication, joining a meeting or collaboration about a given topic, and joining a project associated with the workplace team or some other workplace team.

6. An apparatus, comprising:

a processor; and computer memory holding computer program instructions executed by the processor to provide controlled access to resources in an enterprise environment, the computer program instructions comprising program code configured to:

define a mesh configuration that associates a workplace team to a set of one or more workplace resources, the workplace team having a given role that, with respect to the set of one or more workplace resources, has a set of one or more defined access permissions;

assign to an individual that is not then associated with the workplace team having the given role a physical or virtual token;

responsive to determining that the physical or virtual token of the individual is in physical or logical proximity to a member of the workplace team, modify a scope of the mesh configuration to automatically extend to the physical or virtual token the set of one or more defined access permissions with respect to the set of one or more workplace resources;

access the set of one or more workplace resources using the physical or virtual token that has been automatically extended; and responsive to determining that the physical or virtual token of the individual is no longer in physical or logical proximity to the member of the workplace team, modify the scope of the mesh configuration to revoke from the physical or logical token the set of one or more defined access permissions with respect to the set of one or more workplace resources.

7. The apparatus as described in claim 6 wherein the set of one or more workplace resources are one of: physical facilities, digital resources, installed applications, accounts and data.

8. The apparatus as described in claim 6 wherein the program code is further configured to modify the mesh configuration as a result of tracking activities of the workplace team.

9. The apparatus as described in claim 8 wherein the program code is further configured to adjust the one or more defined access permissions based on modification to the mesh configuration.

10. The apparatus as described in claim 6 wherein the individual is in physical or logical proximity to a member of the workplace team by one of: joining the workplace as a new hire, joining a physical meeting, joining a network-based collaboration, joining a digital communication, joining a meeting or collaboration about a given topic, and joining a project associated with the workplace team or some other workplace team.

11. A computer program product stored in a non-transitory computer readable medium, the computer program product holding computer program instructions that, when executed by a processor in a host processing system, provide controlled access to resources in an enterprise environment, the computer program instructions comprising program code configured to:

define a mesh configuration that associates a workplace team to a set of one or more workplace resources, the workplace team having a given role that, with respect to the set of one or more workplace resources, has a set of one or more defined access permissions;

assign to an individual that is not then associated with the workplace team having the given role a physical or virtual token;

responsive to determining that the physical or virtual token of the individual is in physical or logical proximity to a member of the workplace team, modify a scope of the mesh configuration to automatically extend to the physical or virtual token the set of one or more defined access permissions with respect to the set of one or more workplace resources;

access the set of one or more workplace resources using the physical or virtual token that has been automatically extended; and responsive to determining that the physical or virtual token of the individual is no longer in physical or logical proximity to the member of the workplace team, modify the scope of the mesh configuration to revoke from the physical or virtual token the set of one or more defined access permissions with respect to the set of one or more workplace resources.

12. The computer program product as described in claim 11 wherein the set of one or more workplace resources are one of: physical facilities, digital resources, installed applications, accounts and data.

13. The computer program product as described in claim 11 wherein the program code is further configured to modify the mesh configuration as a result of tracking activities of the workplace team.

14. The computer program product as described in claim 13 wherein the program code is further configured to adjust the one or more defined access permissions based on modification to the mesh configuration.

* * * * *